United States Patent
Palmer et al.

(10) Patent No.: US 10,145,626 B2
(45) Date of Patent: Dec. 4, 2018

(54) INTERNALLY STIFFENED EXTENDED SERVICE HEAT RECOVERY STEAM GENERATOR APPARATUS

(71) Applicant: ALSTOM Technology Ltd, Baden (CH)

(72) Inventors: Donald Richard Palmer, Tolland, CT (US); Richard F. Moore, Tolland, CT (US); Ashok Prabhu, Trichy (IN)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 402 days.

(21) Appl. No.: 14/081,365

(22) Filed: Nov. 15, 2013

(65) Prior Publication Data
US 2015/0136044 A1    May 21, 2015

(51) Int. Cl.
| | |
|---|---|
| *F28F 9/007* | (2006.01) |
| *F22B 1/18* | (2006.01) |
| *F28F 21/00* | (2006.01) |
| *F22B 37/40* | (2006.01) |
| *F22B 15/00* | (2006.01) |

(52) U.S. Cl.
CPC .............. *F28F 9/0075* (2013.01); *F22B 1/18* (2013.01); *F22B 15/00* (2013.01); *F22B 37/40* (2013.01); *F28F 21/00* (2013.01)

(58) Field of Classification Search
CPC . F22B 15/00; F22B 37/24; F28F 21/00; F28F 9/0075
USPC .................. 122/7 R, 406, 466; 138/173, 178
See application file for complete search history.

(56) References Cited

U.S. PATENT DOCUMENTS

| | | | | |
|---|---|---|---|---|
| 3,379,177 | A | * | 4/1968 | Stalph ................... F22B 37/208 122/510 |
| 3,688,803 | A | * | 9/1972 | Pavia ......................... F16L 9/02 138/173 |
| 3,814,063 | A |   | 6/1974 | Bijmholt |

(Continued)

FOREIGN PATENT DOCUMENTS

| | | |
|---|---|---|
| CN | 1190187 A | 8/1998 |
| GB | 2 499 574 A | 8/2013 |

(Continued)

OTHER PUBLICATIONS

British Standard BS 5950-1:2000, "*Structural Use of steelwork in building—Part 1: Code of practice for design rolled and welded sections*", BSI, 2001.

(Continued)

*Primary Examiner* — Steven B McAllister
*Assistant Examiner* — John Bargero
(74) *Attorney, Agent, or Firm* — GE Global Patent Operation; Stephen G. Midgley (57) ABSTRACT

A heat recovery steam generator ("HRSG") includes a first casing having an interior enclosing at least one duct for gas to flow therein along a gas flow axis. Each duct is defined by duct defining members that are spaced apart from each other and extend into the interior of the first casing. A plurality of stiffening members are elongated along the gas flow axis. Each of the stiffening members are positioned between two of the duct defining members. The stiffening members and duct defining members have a substantially similar coefficient of thermal expansion.

15 Claims, 4 Drawing Sheets

(56) References Cited

U.S. PATENT DOCUMENTS

| | | | |
|---|---|---|---|
| 3,965,675 A * | 6/1976 | Martz | F01K 13/02 |
| | | | 122/406.4 |
| 4,316,435 A | 2/1982 | Nagamatsu | |
| 5,181,481 A | 1/1993 | Dietz | |
| 5,318,109 A | 6/1994 | Yamada et al. | |
| 5,329,892 A * | 7/1994 | Svendsen | F22B 31/003 |
| | | | 122/4 D |
| 5,339,891 A | 8/1994 | Kidaloski | |
| 5,370,239 A | 12/1994 | Kidaloski | |
| 5,722,354 A | 3/1998 | Sansoucy | |
| 5,924,389 A | 7/1999 | Palkes et al. | |
| 6,957,630 B1 | 10/2005 | Mastronarde | |
| 7,353,654 B2 | 4/2008 | Bolis et al. | |
| 2004/0226701 A1 * | 11/2004 | Lomax, Jr. | F28D 7/1653 |
| | | | 165/159 |
| 2005/0194120 A1 * | 9/2005 | Lomax, Jr. | F28D 7/0075 |
| | | | 165/100 |
| 2007/0079773 A1 * | 4/2007 | Morin | F23C 10/10 |
| | | | 122/459 |
| 2010/0101564 A1 * | 4/2010 | Iannacchione | F22B 1/006 |
| | | | 126/680 |
| 2011/0048010 A1 | 3/2011 | Balcezak et al. | |
| 2012/0240871 A1 | 9/2012 | Bairley et al. | |
| 2013/0180228 A1 | 7/2013 | Zhang | |
| 2013/0180696 A1 | 7/2013 | Magee et al. | |

FOREIGN PATENT DOCUMENTS

| | | |
|---|---|---|
| JP | 58-011302 A | 1/1983 |
| JP | 08-296807 A | 11/1996 |
| JP | 11-072293 A | 3/1999 |

OTHER PUBLICATIONS

British Standard BS 1113:1999, "*Design and manufacture of water-tube steam generating plant(including superheaters, reheaters and steel tube economizers)*", BSI, 1999.

Almeida, et al., "*HRSG Casing/Isolation Repair Report*", Power Service Report No. 104/08, Oct. 2008.

Shin et al., "*Thermal Stress Analysis in Structural Elements of HRSG Casing*", Intl Journal of Energy Engineering, 2012, 2(5): 202-209.

Pearson et al., "*Reliability and durability from large heat recovery steam generators*", Proc. Instn. Mech. Engrs., vol. 213 Part A, 1999.

Viswanathan, "*Damage Mechanisms and Life Assesment of High-Temperature Components*", ASM International, 1989, p. 118-119.

Anderson et al., "*HRSG Tube Failure Diagnostic Guide*", second edition, Tetra Engineering Group, 2004. p. 5-34.

Machine Translation and First Office Action and Search Report issued in connection with Corresponding CN Application No. 201410651058.2 dated Sep. 25, 2017.

* cited by examiner

INTERNALLY STIFFENED EXTENDED SERVICE HEAT RECOVERY STEAM GENERATOR APPARATUS

TECHNICAL FIELD

The present disclosure relates to a heat recovery steam generator, ductwork related to such devices.

BACKGROUND

Power plants can employ gas turbines with heat recovery steam generators (HRSGs) that may use thermal energy in the exhaust gas turbines to generate steam for power generation or process use. Examples of an HRSG and use of an HRSG may be found in U.S. Patent Application Publication Nos. 2013/0180228, 2013/0180696, 2012/0240871 and 2011/0048010 and U.S. Pat. Nos. 7,353,654, 6,957,630, and 5,924,389. An HRSG may operate at very high temperatures during normal operation at steady state conditions and an inlet area of the HRSG may operate at a temperature that is substantially greater than a temperature of fluid passing out of an outlet of the HRSG. Further, there is often a substantial difference in the temperature within the HRSG as compared to the ambient temperature outside of the HRSG.

The current technology utilized for hot cased HRSGs often experience problems after one to two years of operation. For instance, hot cased HRSGs have employed external reinforcement designs that exhibit failures between stiffeners and the casing of the inlet duct or main casing of the HRSG. Examples of such failures can include cracking of certain structures. Deformation or distortion between the casing and other external elements such as external stiffeners may also occur. The diagonal bracing may also deform or experience cracking where the diagonal bracing is attached to a wall of the HRSG. In addition, the casing to casing connections between adjacent walls of an HRSG may crack allowing hot gas within the HRSG to escape to the atmosphere. To resolve such issues, an HRSG is often required to be shut down for repair within its first couple of years of service.

SUMMARY

According to aspects illustrated herein, there is provided an HRSG comprises a first casing having an interior enclosing at least one first duct for gas to flow therein along a gas flow axis. Each first duct is defined by duct defining members that are spaced apart from each other and extend into the interior of the first casing. A plurality of stiffening members elongated along the gas flow axis are also included in the first casing. Each of the stiffening members is positioned in the interior and is positioned between two of the duct defining members. The stiffening members and duct defining members have a substantially similar coefficient of thermal expansion.

According to other aspects illustrated herein a vertical HRSG component comprises a first module having a first casing enclosing at least one first duct for gas to pass therethrough along a gas flow axis. The first casing includes first duct defining members and a plurality of first stiffening members. Each first duct is defined by spaced apart first duct defining members extending within the casing. The first stiffening members are positioned between the spaced apart first duct defining members. The first stiffening members are elongated along the gas flow axis. The first stiffening members and the first duct defining members all have a substantially similar coefficient of thermal expansion.

According to other aspects illustrated herein a vertical HRSG comprises an enclosure having an exterior including a top and a bottom opposite the top, the top defining an upper opening and the bottom defining a lower opening. The exterior also has a first side, a second side, a third side, and a fourth side. The first side extends from the top to the bottom and is positioned between the second side and the third side. The second side extends from the top to the bottom and is positioned between the first side and the fourth side. The third side extends from the top to the bottom and is positioned between the first side and the fourth side. The fourth side extends from the top to the bottom and is positioned between the second side and the third side such that the fourth side faces the first side and the second side faces the third side. A plurality of duct defining members extend within the enclosure. The duct defining members extend within the enclosure and define at least one duct defined within the enclosure for gas to pass through the at least one duct along a gas flow axis extending from the bottom of the enclosure to the top of the enclosure. A plurality of internal stiffening members are within the enclosure. Each of the internal stiffening members is elongated along the gas flow axis and is positioned between two of the duct defining members. The internal stiffening members and the duct defining members have a substantially similar coefficient of thermal expansion.

The above described and other features are exemplified by the following figures and detailed description.

BRIEF DESCRIPTION OF THE DRAWINGS

Referring now to the figures, which are exemplary embodiments, and wherein the like elements are numbered alike.

Other details, objects, and advantages of embodiments of the innovations disclosed herein will become apparent from the following description of exemplary embodiments and associated exemplary methods.

DETAILED DESCRIPTION

Disclosed herein is a heat recovery steam generator ("HRSG") that is configured so that differential metal temperatures and resulting differential thermal expansion of elements of the HRSG are taken into consideration and minimized in its design and construction. This is directly contrary to current, conventional considerations used in designing and making HRSGs. For instance, current design consideration guidelines say that stresses caused by differential metal temperatures and resulting differential thermal expansion experienced by duct plates, external stiffeners or other elements of an HRSG can be ignored and stresses that can result from temperature differentials caused by thermal conditions within an HRSG are consequently conventionally ignored in the design and fabrication of HRSGs. In spite of this currently conventional guideline, it has been determined through substantive and innovative effort that stresses that can result from temperature differentials should not be ignored when designing and fabricating HRSGs. Thermal differential stresses can be accounted for in the design and fabrication of HRSGs and that a HRSG can be configured so that it can accommodate stresses that can result from temperature differentials within the HRSG. Making design selections accounting for stresses that can be caused by thermal differential conditions within an HRSG can permit the HRSG to have a duty cycle that is many times longer than conventional HRSG designs. For instance, in some embodiments of the HRSG, it is contemplated that the duty cycle that is many times longer than conventional HRSG designs.

Referring to the exemplary embodiment of a vertical HRSG 100 illustrated in FIGS. 1-4, the HRSG can include a first casing 100a, which can also be considered a main casing, that is positioned between an inlet duct 100b and an outlet duct 100c. The embodiment of the HRSG shown in FIGS. 1-4 can be configured as an internally stiffened hot cased HRSG and the first casing 100a can be configured as an internally stiffened hot casing. Embodiments of the internally stiffened extended service HRSG can be hereinafter referred to as an "ISES HRSG".

The outlet duct 100c can be considered a stack in some embodiments of the ISES HRSG. Heated gas from a turbine can be received into the ISES HRSG via the inlet duct 100b. The heated gas can pass through the inlet duct, into the first casing 100a, and can be emitted out of the ISES HRSG and into the atmosphere via the outlet of the outlet duct 100e. The inlet duct 100b can be communicatively connected to an outlet of a turbine such as a combustion turbine or another processing unit of a plant that can emit hot gas. One or more conduits can connect the inlet duct 100b to the turbine or one or more units of a plant that can feed hot gas to the ISES HRSG. The hot gas received by the inlet duct 100b of the ISES HRSG can be at a relatively high temperature, such as 500-600° C. and can be emitted from the outlet of the ISES HRSG at a lower temperature, such as 100-200° C. For example, hot gas can be received in the inlet duct 100b at 550° C., 575° C. or 600° C. and be emitted from the outlet duct 100c into the atmosphere (e.g. air external to the plant of the ISES HRSG or the ISES HRSG) at a temperature of 150° C., 175° C., or 200° C. As an alternative, gas emitted from the outlet duct 100c of the ISES HRSG can be fed to another device (not shown) for further processing or use of the emitted gas instead of being emitted to the atmosphere.

The ISES HRSG 100 can be configured so that the ISES HRSG includes a first casing having an enclosure that has an interior enclosing at least one first duct for gas to flow therein along a gas flow axis 102. The gas flow axis 102 can be a vertical axis that extends along a y-axis such that gas can flow vertically through one or more first ducts 305 from a lower section of the ISES HRSG to an upper section of the ISES HRSG that is above the lower section. It should be appreciated that the x-axis x, y-axis y and z-axis z identified in FIGS. 1-4 can be configured so that the y-axis can define a vertical height direction, a z-axis can define a depth direction and the x-axis can define a length direction.

Figure 1:
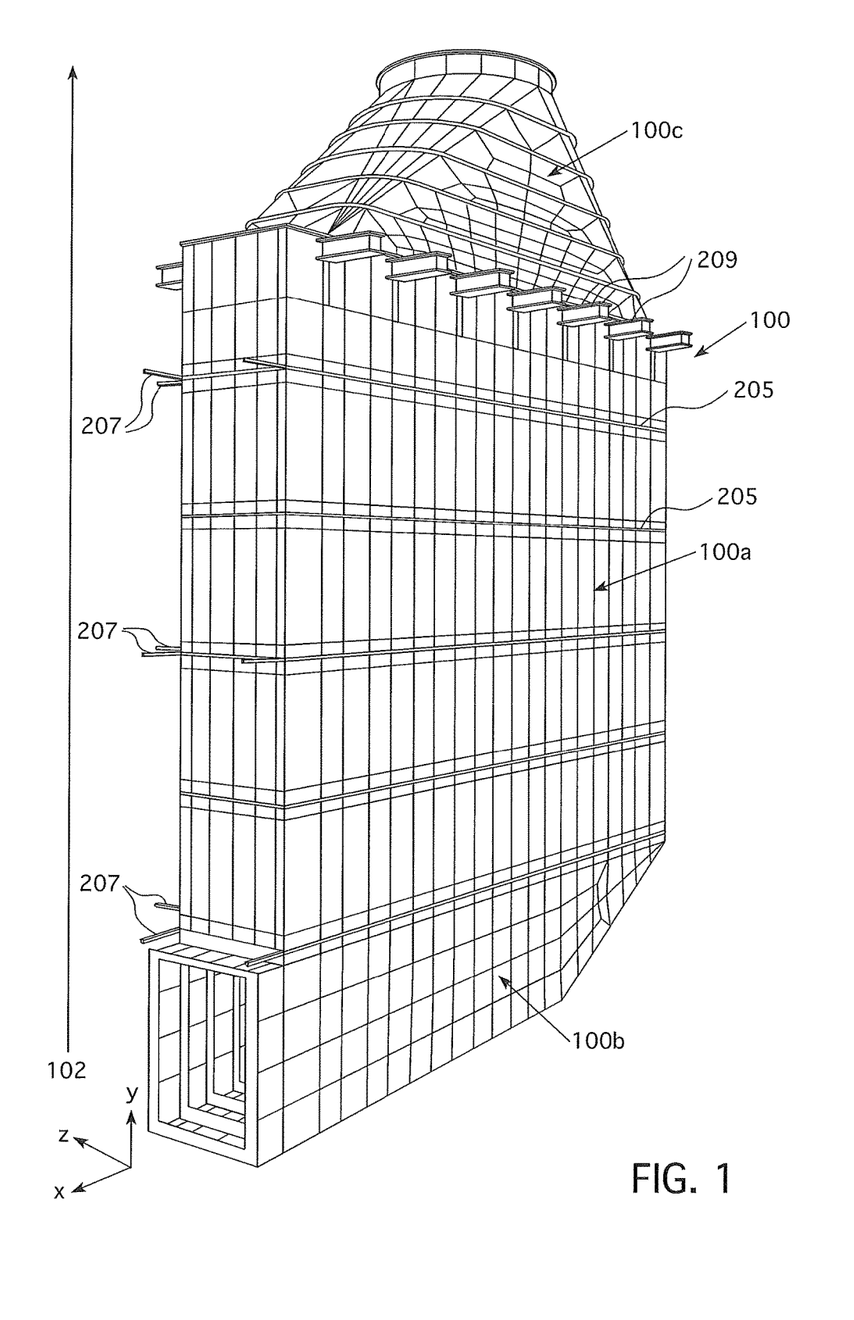
FIG. 1 is a perspective view of a first exemplary embodiment of an HRSG. It should be appreciated that structural steel that can be positioned around at least a portion of the perimeter of the HRSG to support the HRSG is not shown in FIG. 1.
Figure 2:
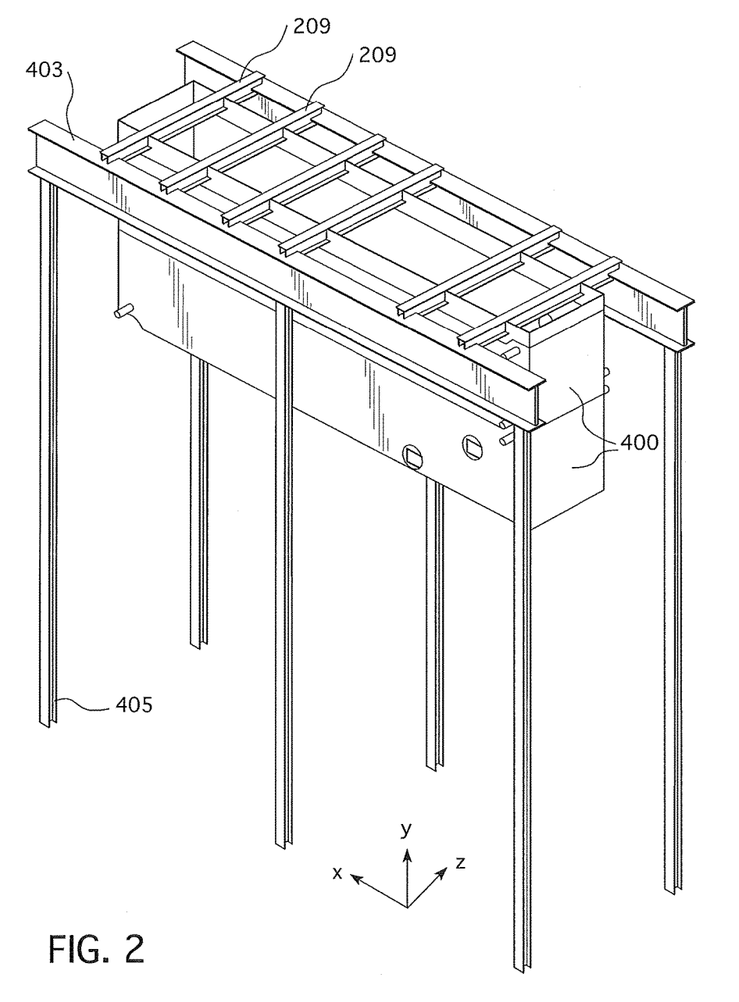
FIG. 2 is a perspective view of the first exemplary embodiment of the HRSG at a first stage of completion in construction of the HRSG.

As may best be appreciated from FIG. 2, the first casing 100a can be comprised of a plurality of modules that are interconnected to form the first casing 100a. Each module 400 can be box like in shape such as a construction having a top, a bottom and first, second, third and fourth sides extending from the top to the bottom such that the first side is between the second and third sides and faces the fourth side. The top and bottom of each module can be generally open so that gas is flowable out of one module and into another module of the first casing 100a. As such, the top and bottom of each module can have a top surface that is generally annular in shape and a bottom surface that is generally annular in shape.

Figure 3:
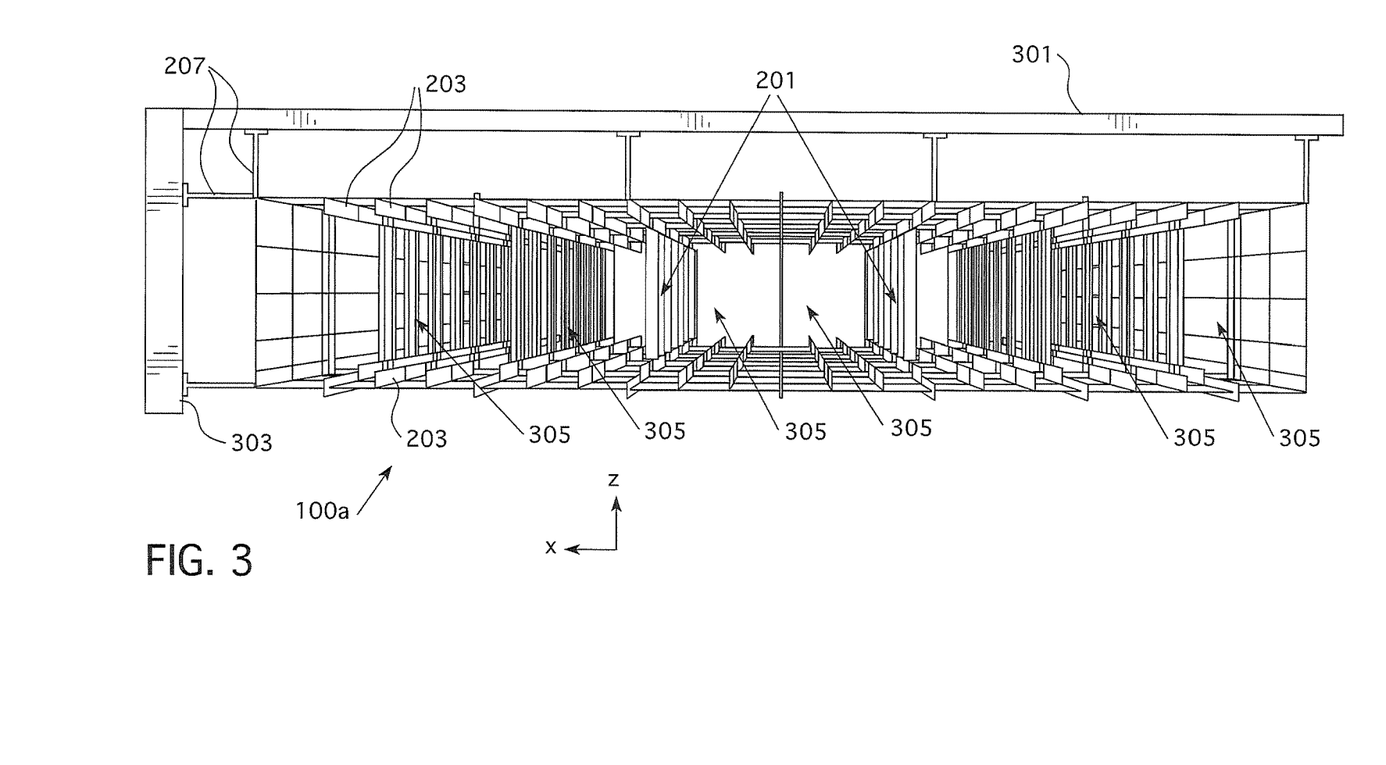
FIG. 3 is a fragmentary top view of the first exemplary embodiment of the HRSG with portions of the HRSG cut away to illustrate stiffening members and duct defining members of the HRSG.
Figure 4:
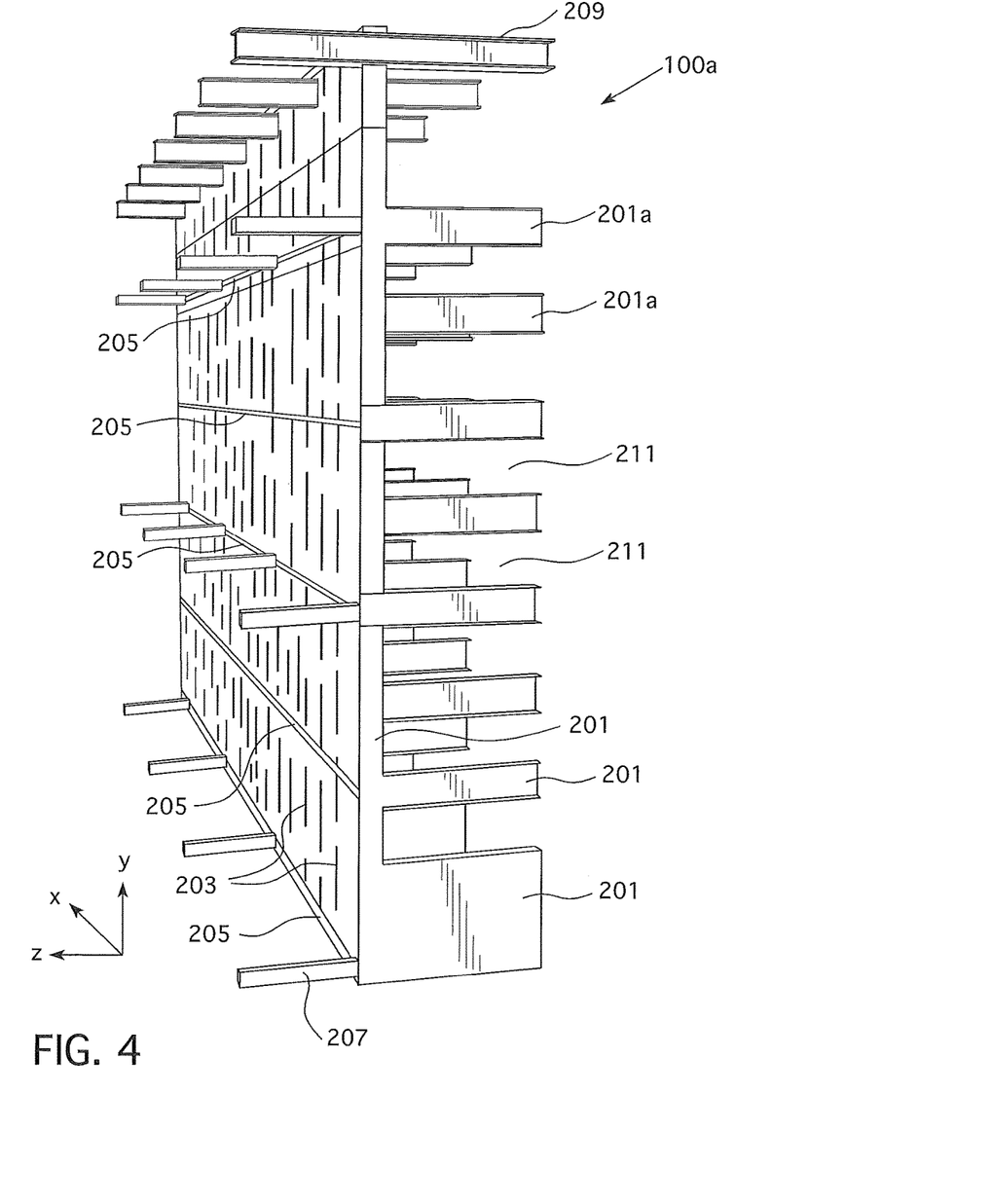
FIG. 4 is a fragmentary perspective view of the first exemplary embodiment of the HRSG with portions of the HRSG cut away to illustrate stiffening members and duct defining members of the HRSG.

As may best be appreciated from FIGS. 3-4, the plurality of interconnected modules 400 can define a matrix of interconnected flanges 205, duct defining members 201 and stiffening members 203 that are all internal to the enclosure of the first casing 100a of the HRSG and are all equally affected or substantially equally affected (e.g. affected within a range of +/−5% of each other) by thermal expansion that can result from the hot gas that passes through the one or more ducts 305 of the ISES HRSG by expanding due to the heat of that gas. The duct defining members 201 have internally extending portions 201a that can extend from one internal side of a casing to another internal side of a casing to tie the casing sidewalls together under pressure loads and for the transfer of wind and seismic loads to the links 207, which functions to effectively transfer such loads to the structural steel to which the links 207 are attached.

Each module can be defined by an upper flange 205 and a lower flange 205. The modules may be interconnected to each other such that a lower flange of one module can be attached to an upper flange of a module that is immediately below that module. An upper flange of a module can be attached to a lower flange of a module that is positioned immediately above that module. It should be appreciated that immediately adjacent modules can be modules that directly contact each other or are directly adjacent to each other without having another module positioned between those immediately adjacent modules. Sides of a module that are immediately adjacent to each other can have edges that directly contact each other or can be positioned such that no other side is between those immediately adjacent sides.

The ISES HRSG can be configured to only have one first duct 305 through which hot gas passes or can have more than one first duct 305 through which hot gas passes. Each first duct 305 can be defined by duct defining members 201 that are spaced apart from each other and extend into the interior of the first casing. A plurality of stiffening members 203 that are elongated along the gas flow axis 102 can also be included in the first casing. Each of the stiffening members 203 can be positioned in the interior of the enclosure defined by the first casing and can be positioned between two of the duct defining members 201 adjacent the first duct 305 defined by at least those two duct defining members 201. The stiffening members and duct defining members can be composed of materials having substantially similar coefficients of thermal expansion. For example, the coefficient of thermal expansion of the material of which the duct defining members 201 are composed (e.g. a particular grade or type of steel or other metal) can be identical to or be within 5% of the coefficient of thermal expansion of the material of which the stiffening members 203 are composed (e.g. a particular grade or type of steel, alloy, or other type of metal). As another example, the stiffening members and duct defining members can be composed of materials having substantially similar coefficients of thermal expansion when the coefficient of thermal expansion of the material of which the duct defining members 201 are composed (e.g. a particular grade or type of steel or other metal) differs by between 0.5% and 3.0% of the coefficient of thermal expansion for the material of which the stiffening members 203 are composed (e.g. a particular grade or type of steel, alloy, or other type of metal). Duct defining members having a coefficient of thermal expansion that is between 90% and 110% of the coefficient of thermal expansion of the stiffening members 203 is yet another example of substantially similar coefficients of thermal expansion values.

In some embodiments, the stiffening members can be exclusively in the interior of the enclosure of the first casing and the first casing can be configured so that the stiffening members and duct defining members are all that is needed for supporting and defining the one or more first ducts 305 defined in the enclosure of the first casing. In contrast to conventional HRSG designs that often utilize diagonal braces, embodiments of the ISES HRSG can be configured so that no diagonal braces extend into one or more first duct 305. The stiffening members 203 can be positioned around the perimeter of first ducts 305 between the duct defining members 201. The stiffening members 203 can be plates, beams, bars, rods or other structures that are composed of a metal. The duct defining members 201 can also be composed of metal and can be tube sheets, plates, members or other structures that are composed of metal and extend into the interior of the first casing to at least partially define the one or more ducts within the casing. The metal of the stiffening members 201 can have a coefficient of thermal expansion that is substantially similar to the coefficient of thermal expansion of the metal from which the duct defining members 201 are formed (e.g. the coefficient of thermal expansions can be identical or within 5%). The duct defining members 201 can be configured to define openings 211, gaps or other types of apertures within the body of the duct defining members 201. The openings 211 can be configured to help facilitate a desired gas flow through the ducts or a desired heat transfer of heat from the gas flowing within the ducts defined by the duct defining members 201. The duct defining members 201 can also have other apertures formed therein via drilling or other aperture forming mechanisms to permit structures to be passed through the ducts of the ISES HRSG. For example, openings can be drilled into the duct defining members 201 that are sized to receive tubing for a heat exchanger that can extend through ducts of the ISES HRSG so that the heat exchanger can be used for transferring heat from the gas passing through the ISES HRSG to fluid within the tubes of the heat exchanger. An example of such a heat exchanger can be an evaporator that evaporates water into steam using heat from the gas passing through the ISES HRSG for feeding such steam to a steam drum of an electricity production plant or other industrial use of steam.

The openings formed in different duct defining members can be positioned so that the openings of different duct defining members align with each other so that tubes can extend horizontally through the ducts of the ISES HRSG and pass from one side to an opposite side of the ISES HRSG. Each duct defining member can have a plurality of openings formed therein that are vertically spaced apart from each other to permit numerous rows of vertically spaced sets of heat exchanger conduits to pass through the HRSG for transferring heat from the gas passing through the ISES HRSG to the fluid within those conduits. For instance, a duct defining member 201 can have at least three openings formed therein that are each spaced apart from each other along a length or height of the duct defining member so that a first opening is between an upper opening and a lower opening. Openings 211 can also be defined within the duct defining members for aligning openings 211 or otherwise organizing a matrix of openings 211 within the duct defining members 201 to facilitate a desired gas flow or heat transfer profile within the ducts of the ISES HRSG.

Each of the flanges 205 can extend around all of the at least one duct defined by the duct defining members of the module 400 and each of the upper and lower flanges 205 of a module 400 can be internal flanges that are attached to a plurality of the duct defining members 201, a plurality of the internal stiffening members 203 and a plurality of the links 207 that extend from the module 400 for attachment to structural steel that can be positioned adjacent to the ISES HRSG. Each internal flange 205 can be comprised of elongated plates, beams, or other members that are interconnected to each other to define an annular structure. The interconnected elements of each internal flange 205 can be fastened together via fasteners, welding, or other interconnecting mechanisms to define the annular structure of the internal flange 205. The internal flanges 205 can each be formed of a material having a coefficient of thermal expansion that is substantially similar to the coefficient of thermal expansion of the duct defining members (e.g. the coefficient of thermal expansion of the internal flanges 205 is identical to or differs by +/−5%, of the coefficient of thermal expansion for the stiffening members 203 and is also identical to or differs by +/−5% of the coefficient of thermal expansion of the duct defining members 201).

Each of the links 207 can be connected to at least one of the duct defining members 201 and one of a lower internal annular flange and the upper internal annular flange of a module 400. The links 207 can extend from an exterior of the first casing on only two immediately adjacent sides of the first casing for attachment to structural steel adjacent those two immediately adjacent sides of the first casing. For example, the links 207 can extend from adjacent a rear and a left side of the first casing for attachment to structural steel adjacent those sides. As another example, the links 207 can only extend from the front and left side of the first casing for attachment to the structural steel adjacent to those sides of the first casing. As yet another example, the links 207 can only extend from the rear and right side of the first casing for attachment to the structural steel adjacent those sides. The structural steel to which the links 207 are attached can be significantly colder than the temperature of the heated gas passing through the one or more ducts of the ISES HRSG, the temperature of the internal duct defining members 201 and the temperature of the internal stiffening members 203. For instance, the structure steel can be at an ambient temperature that is the same or is generally the same as the temperature of the environment around the site in which the ISES HRSG is positioned, while the temperature of the heated gas passing through the ISES HRSG and the flanges 205, stiffening members 203 and duct defining members 201 can range from 150° C. to 550° C.

Insulation can be positioned between the modules 400 and the structural steel to help retain heat within the one or more ducts 305 of the HRSG so that efficient use of that heat can be achieved. The links 207 can extend through a layer of insulation positioned between the enclosure defining the one or more ducts 305 and an outer frame that includes structural steel supports for supporting the ISES HRSG.

When the links 207 extend from only two immediately adjacent sides of the ISES HRSG for connecting to structural steel adjacent those two sides, the other sides of the ISES HRSG are permitted to expand under thermal loads, which can result in substantially reducing the thermal stresses experienced by the ISES HRSG that result from expansion of the elements of the ISES HRSG due to the thermal conditions within the ISES HRSG. The reduction in thermal stresses achieved by embodiments of the ISES HRSG permits components of the ISES HRSG such as internal flanges, internal stiffening members and internal duct members to support loads of the ISES HRSG without use of diagonal braces or support provided by external stiffener elements.

Each module 400 of the first casing 100*a* can be considered a component of a vertical ISES HRSG. Each module 400 can include a first casing enclosing at least one first duct 305 for gas to pass therethrough along a gas flow axis 102. The first casing of the module 400 can include first duct defining members. Each first duct 305 can be defined by spaced apart first duct defining members 201 that extend within the casing. A plurality of first stiffening members 203 are also positioned between the spaced apart first duct defining members 201 and are elongated along the gas flow axis 102. For instance, the stiffening members can be elongated vertically. The first stiffening members and the first duct defining members can all have a substantially similar coefficient of thermal expansion. (e.g. the coefficient of thermal expansion of the duct defining members 201 can differ by +/−10% or +/−5% of the coefficient of thermal expansion of the stiffening members 203). Each module 400 can be configured so that there are no diagonal braces that extend into the at least one first duct 305.

Each module 400 can include an upper annular flange 205 and a lower annular flange 205. The upper annular flange can be attached to upper ends of the first duct defining members of that first module and upper ends of the first stiffening members of the first module. The lower annular flange can be attached to lower ends of the first duct defining members and lower ends of the first stiffening members. Each module 400 can also include a plurality of links 207 for connecting to structural steel that is to be positioned adjacent the module 400. Each of the links can be connected to one of the first duct defining members 201 and one of the lower annular flange 205 and the upper annular flange 205.

Each module can have a casing that includes a top annular surface that defines an upper opening, a bottom annular surface that defines a lower opening, a first side between the top surface and the bottom surface, a second side between the top surface and the bottom surface, a third side between the top surface and the bottom surface, and a fourth side between the top surface and the bottom surface. The links 207 can extending from only the first and second side of the first casing to restrain expansion of the first and second sides of the first casing so that expansion of the first casing caused by thermal conditions with the first module will result in expansion of the first casing to substantially occur via freedom of expansion of the third and fourth sides of the first casing.

As can be appreciated from FIGS. 1-4, an embodiment of the ISES HRSG can be a vertical ISES HRSG that has an enclosure having an exterior comprising a top and a bottom opposite the top and a first side, a second side, a third side, and a fourth side. The first side can extend from the top to the bottom and be positioned between the second side and the third side. The second side can extend from the top to the bottom and be positioned between the first side and the fourth side. The third side can extend from the top to the bottom and be positioned between the first side and the fourth side. The fourth side can extend from the top to the bottom and be positioned between the second side and the third side such that the fourth side faces the first side and the second side faces the third side. A plurality of duct defining members 201 can extend within the enclosure. The duct defining members 201 can extend within the enclosure and define at least one duct defined within the enclosure for gas to pass through at least one duct along a gas flow axis 102 extending from the bottom of the enclosure to the top of the enclosure. A plurality of internal stiffening members 203 can be positioned within the enclosure. Each of the internal stiffening members 203 are elongated along the gas flow axis 102 and positioned between two of the duct defining members 201. The internal stiffening members and the duct defining members have a substantially similar coefficient of thermal expansion. (e.g. the coefficient of thermal expansion of the duct defining members 201 can differ by +/−10% or 5% of the coefficient of thermal expansion of the stiffening members 203).

Each of a plurality of links 207 can be attached to a respective one of the duct defining members 201 and extend therefrom for extending from one of the first side of the enclosure and the second side of the enclosure for attachment to structural steel adjacent the first and second sides of the enclosure. The links 207 can extend from only the first and second sides of the enclosure so that expansion of the enclosure caused by thermal conditions within the enclosure will result in expansion of the enclosure to substantially occur via expansion of the third and fourth sides of the enclosure, which are not restrained via links 207 and the structural steel to which those links 207 are attached. The links 207 can be configured for attachment to first and second structural steel supports 301 and 303 adjacent the first and second sides of the enclosure so that expansion of the enclosure caused by thermal conditions within the enclosure will result in only expansion of the third and fourth sides of the enclosure.

In some embodiments, the modules 400 can be interconnected such that a bottom-most module 400 is connected to an inlet duct 100*b* and a top most module 400 is connected to an outlet duct 100*c* of the ISES HRSG. The uppermost module 400 can have an upper flange that is attached to upper supports 209 that connect the uppermost module to steel beams 403 that are supported by steel supports 405. The upper supports 209 can be flange roof beams that are supported by wide flange columns or other types of steel beams 403 and steel supports 405 of a frame of the ISES HRSG. Other structures can also be attached to the steel beams 403 and supports 405 and can define an outer housing, or frame for the HRSG. First and second structural steel supports 301 and 303 can be positioned on two immediately adjacent sides of the ISES HSRG and be configured for supporting the ISES HRSG and helping the ISES HRSG stay upright. The first and second structural steel supports 301 and 303 can be portions of an external frame that support the ISES HRSG or can be separate steel structures that are external to the ISES HRSG and adjacent external sides of the HRSG. The first and second structural steel supports 301 and 303 can be attached to a foundation system of a production site.

Links 207 can extend from the modules 400 to these first and second structural steel supports 301 and 303. The links 207 can be attached to different flanges of the modules so that the links 207 have a pre-specified spacing. For example, a first row of links 207 can be attached to a lower flange 205 of a lower module and a second row of links 207 immediately above the first row of links can be attached to an upper flange of the module positioned immediately above the lower module such that a distance equal to the height of two modules spaces the lower first row from the upper second row. The links 207 of the second row of links can be connected to both the upper flange of the lower module and the lower flange of the upper module as well as to duct defining members of both the lower and upper module. Each of the links 207 can be attached the flanges 205 adjacent to where the link 207 is attached to the duct defining members of the upper and lower modules. Additional modules can be interconnected in a matrix utilizing the same spacing of links for attachment to flanges of immediately adjacent modules and duct defining members of those modules. For instance, the matrix of modules can be interconnected so that a third row of links 207 is positioned above the second row of links and is spaced from the second row by the height of two modules as well.

In yet other embodiments, the matrix of links 207 and modules 400 can be configured differently. For instance, links 207 can be attached to each flange 205 of each module as well as to the duct defining members 201 of those modules to which that link is attached. Each link 207 can be attached to at least one respective duct defining member 201 and a respective one of the flanges in such embodiments.

The links 207 can be configured for attachment to structural steel adjacent to two immediately adjacent sides of the first casing 100a. For instance, a rear and left side of the casing or a rear and right side of the casing can have links 207 extending therefrom for attachment to first and second structural steel supports 301 and 303. Only those two immediately adjacent sides can have such links extend therefrom for attachment to structural steel for supporting the ISES HRSG. The links 207 can be metal beams or metal members. For instance, the links 207 can be rigid steel beams or steel members. The links 207 provide a rigid attachment to the structural steel that can prevent, or at least substantially restrain, expansion of the duct defining members and flanges of the modules of the ISES HRSG toward those two sides from which the links extend. The other two sides of the first casing 100a that do not have links extending therefrom are not so restrained, which can facilitate the first casing expanding about those two unrestrained sides of the ISES HRSG due to the thermal conditions experienced within the one or more ducts 305 of the HRSG. The expansion of the ISES HRSG in these two directions still permit the ISES HRSG to be held upright via the attachment of the links 207 to the structural steel adjacent the other two sides of the ISES HRSG. Further, because the elements of the ISES HRSG all have substantially the same coefficient of thermal expansion, the elements all expand comparably in a direction of those unrestrained sides, which can permit the ISES HRSG structure to expand due to the thermal conditions of the gas passing through the ISES HRSG without the ISES HRSG structure experiencing cracking or distortions due to elements expanding at substantially different rates due to the different thermal conditions those elements can experience.

When configured as a vertical ISES HRSG, the expansion of the unrestrained sides of the ISES HRSG allows a bottom portion of the HRSG (such as a lower portion of the first casing 100a of the ISES HRSG that is closest to the inlet duct 100b of the ISES HRSG that receives the hottest gas) to freely expand out to a greater extent than the upper portions of the HRSG (which are closer to the outlet duct 100c). This can help contribute to improved structural integrity of the unrestrained sides of the ISES HRSG as the complex variations of expansion rates are readily accommodated without detracting from proper support of the bottommost portion of the ISES HRSG from the less expanded upper portions of the ISES HRSG.

Embodiments of the ISES HRSG can also have the inlet duct 100b fabricated to have one or more ducts defined within an enclosure of an internally stiffened hot casing. The inlet duct 100b can have an enclosure defined by multiple interconnected modules similar to module 400. The inlet duct 100b or modules of the inlet duct can also be considered components of the ISES HRSG. The modules of the inlet duct can be structured similarly to modules of the first casing 100a, but have a slightly different shape or geometry or define differently shaped ducts through which hot gas can pass. The modules of the inlet duct 100b can include internal flanges that are connected to upper ends of duct defining members and internal flanges attached to lower ends of the duct defining members. Each module of the inlet duct can be connected to immediately adjacent inlet duct modules to form the enclosure. For instance, an upper internal flange of one module can be directly connected to a lower internal flange of an immediately adjacent module of the inlet duct 100b. Each of the internal flanges can be annular structures. An inlet end of the inlet duct can have an opening formed therein for receiving hot gas from one or more sources and an outlet end that is connected to the first casing 100a so that hot gas passes from the inlet duct 100b to the one or more ducts 305 of the first casing 100a. The internal stiffening members, internal flanges, and the duct defining members of the inlet duct 100b or inlet duct modules can have a substantially similar coefficient of thermal expansion. (e.g. the coefficient of thermal expansion of the duct defining members, internal flanges, and internal stiffening members can differ by +/−10% or 5%).

Links, such as rigid steel beams or other steel members can be attached to flanges and duct defining members of the inlet duct 100b for attachment to the structural steel, such as structural steel supports for supporting the inlet duct 100b. It should be appreciated that such links can transfer loads to the structural steel similarly to links 207 discussed herein. The links can only extend from two immediately adjacent sides of the inlet duct 100b so that the other sides of the inlet duct 100b are configured so that expansion from thermal conditions within the inlet duct 100b can occur exclusively, or substantially exclusively about the unrestrained sides of the inlet duct 100b (e.g. the sides of the inlet duct about which no links 207 extend for attachment to the structural steel). Insulation can be positioned between an exterior of the enclosure and the frame of the structural steel as well to help ensure efficient use of the heat of the heated gas passing through the one or more ducts defined within the enclosure of the hot casing of the inlet duct 100b. The links extending from the inlet duct modules can extend through such insulation for attachment to the structural steel.

Often, conventional HRSGs must be shut down within the first one to two years of operation so that cracking and structural distortions can be remediated prior to the HRSG being restarted and further used. This contributes to a major cost and inconvenience to an operator of the HRSG. Embodiments of the ISES HRSG can be configured to avoid such cracks and distortions so that such shut downs within the first one or two years of operation can be avoided. Embodiments of the ISES HRSG can therefore provide substantial cost savings to operators of plants utilizing one or more embodiments of the ISES HRSG. Additionally, embodiments of the ISES HRSG are configured to account for thermal stresses caused by the temperature differential of the gas passing through the ISES HRSG so that the duty cycle of an embodiment of the ISES HRSG can be configured to have a duty cycle that is many times longer (e.g. at least 4-5 times longer) than the duty cycle of a conventional HRSG.

It should be appreciated that various changes can be made to embodiments of the ISES HRSG to account for different design criteria. For instance, the size and shape of duct defining members and stiffening members can be any of a number of suitable sizes and shapes. As another example, the size and shape of the enclosure of a module or enclosure of an ISES HRSG that encloses ducts for gas to flow from an inlet of the ISES HRSG to an outlet of the HRSG can be any of a number of sizes to accommodate hot gases at any of a number of possible flow rates that can be received by the ISES HRSG from turbines or other units that emit hot gas. The external surface of the ISES HRSG enclosure can be configured so that no stiffening elements that are conventionally present on the exterior of a conventional HRSG are present. For instance, embodiments of the ISES HRSG can not include any stiffening fins or ribs on the external surface of the ISES HRSG enclosure that encloses the one or more ducts through which hot gas received by the ISES HRSG passes. As yet another example, the ISES HRSG can be configured so that evaporators or other types of heat exchanges can be configured to pass through the enclosure or one or more ducts of an embodiment of the ISES HRSG so that heat from the hot gas that can flow through the ISES HRSG is transferred to a fluid. Water, for example, can be heated via such an evaporator to evaporate the water and transform the water into steam for use in other processing of a plant that can utilize an embodiment of the ISES HRSG. The heat exchangers can be attached to the ISES HRSG or supported adjacent to the ISES HRSG. As yet another example, it is contemplated that the duct defining members and stiffening members, and flanges can be utilized to form modules for forming the inlet duct 100b of the ISES HRSG and that links can extend from only two sides of the inlet duct for attachment to structural steel for supporting the inlet duct 100b of an ISES HRSG.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat recovery steam generator ("HRSG"), comprising;
    a first casing having an interior enclosing at least one first duct for a heated gas to flow therein along a heated gas flow axis, the heated gas defining a higher temperature within the interior of the casing than outside the casing;
    each first duct being defined by duct defining members spaced apart from each other and extending into the interior of the first casing; and
    a plurality of stiffening members elongated along the heated gas flow axis; each of the stiffening members positioned within the casing interior and positioned between two of the duct defining members;
    wherein the stiffening members and duct defining members have a substantially similar coefficient of thermal expansion; and
    a plurality of modules, each of the modules attached to at least one other module, each of the modules comprising:
        a plurality of the duct defining members and a plurality of the stiffening members, an upper annular flange and a lower annular flange, the upper annular flange attached to upper ends of the duct defining members of that module and upper ends of the stiffening members of that module, the lower annular flange attached to lower ends of the duct defining members and lower ends of the stiffening members;
        a plurality of links, each of the links being connected to at least one of the duct defining members and one of the lower annular flange, and the upper annular flange, the links extending from an exterior of the first casing on only two immediately adjacent sides of the first casing for attachment to structural steel adjacent those two immediately adjacent sides of the first casing.

2. The HRSG of claim 1, wherein the stiffening members are exclusively in the interior of the first casing and wherein diagonal braces extend into the first duct.

3. The HRSG of claim, comprising:
    an inlet duct for receiving the gas; and
    an outlet duct, wherein the first casing is positioned between the inlet duct and the outlet duct.

4. The HRSG of claim 1, wherein the HRSG is a vertical HRSG and the gas flow axis is a vertical axis such that the gas flows vertically through each first duct and wherein the duct defining members are metal structures and the stiffening members are metal structures.

5. The HRSG of claim 1, wherein the coefficient of thermal expansion of the duct defining members is identical to the coefficient of thermal expansion of the stiffening members; or wherein the coefficient of thermal expansion of the duct defining members is between 90% and 110% of the coefficient of thermal expansion of the stiffening members.

6. The HRSG of claim 1, wherein no diagonal braces extend into the at least one first duct.

7. The HRSG of claim 1, further comprising:
    an inlet duct; and
    an outlet duct, the first casing being positioned between the inlet duct and the outlet duct.

8. The HRSG of claim 1, further comprising:
    an upper annular flange and a lower annular flange, the upper annular flange attached to upper ends of the first duct defining, members of that first module and upper ends of the first stiffening members of the first module, the lower annular flange attached to lower ends of the first duct defining members and lower ends of the first stiffening members.

9. The HRSG of claim 8, wherein the first module comprises;
    a plurality of links for connecting to structural steel that is to be positioned adjacent the HRSG, each of the links connected to one of the first duct defining members and one of the lower annular flange and the upper annular flange.

10. The HRSG of claim 9, wherein the first casing comprises;
    a top surface defining an upper opening;
    a bottom surface defining a lower opening;
    first side between the top surface and the bottom surface;

a second side between the top surface and the bottom surface;
a third side between the top surface and the bottom surface; and
a fourth side between the top surface and the bottom surface, the links extending from only the first and second side of the first casing to restrain expansion of the first and second sides of the first casing so that expansion of the first casing caused by thermal conditions will result in expansion of the first casing to substantially occur via expansion of the third and fourth sides of the first casing.

11. The HRSG of claim 1, wherein the coefficient of thermal expansion of the first duct defining members is identical to the coefficient of thermal expansion of the first stiffening members; or
wherein the coefficient of thermal expansion of the first duct defining members is a value that is between 90% and 110% of the coefficient of thermal expansion of the first stiffening members.

12. A vertical heat recovery steam generator ("HRSG"), comprising:
an enclosure having an exterior including a top and a bottom opposite the top, the top defining an upper opening and the bottom defining a lower opening, the exterior also having a first side, a second side, a third side, and a fourth side, the first side extending from the top to the bottom and positioned between the second side and the third side, the second side extending from the top to the bottom and positioned between the first side and the fourth side, the third side extending from the top to the bottom and positioned between the first side and the fourth side, the fourth side extending from the top to the bottom and positioned between the second side and the third side such that the fourth side faces the first side and the second side faces the third side;
a plurality of duct defining members extending within the enclosure, the duct defining members extending within the enclosure and defining at least one duct defined within the enclosure for a heated gas to pass through the at least one duct along a gas flow axis extending from the bottom of the enclosure to the top of the enclosure, the heated gas defining a higher temperature within the interior of at least one duct than outside the at least one duct,
a plurality of internal stiffening members within the enclosure, each of the internal stiffening members elongated along the heated gas flow axis and positioned within the casing interior between two of the duct defining members;
wherein the internal stiffening members and the duct defining members have a substantially similar coefficient of thermal expansion; and
a plurality of links, each of the links attached to a respective one of the duct defining members and extending therefrom for extending from one of the first side of the enclosure and the second side of the enclosure for attachment to structural steel adjacent the first and second sides of the enclosure;
wherein the links extend from only the first and second sides of the enclosure so that expansion of the enclosure caused by thermal conditions within the enclosure will result in expansion of the enclosure to substantially occur via expansion of the third and fourth sides of the enclosure.

13. The HRSG of claim 12, wherein the links are configured for attachment to structural steel adjacent the first and second sides of the enclosure so that expansion of the enclosure caused by thermal conditions within the enclosure will result in only expansion of the third and fourth sides of the enclosure; and
wherein the coefficient of thermal expansion of the duct defining members is a value that is between 90% and 110% of the coefficient of thermal expansion of the internal stiffening members.

14. The HRSG of claim 12, comprising:
a plurality of internal flanges, each of the internal flanges extending around all of the at least one duct defined by the duct defining members, each of the internal flanges attached to a plurality of the duct defining members, a plurality of the internal stiffening members, and a plurality of the links; and
wherein each of the links is attached to at least a respective two of the duct defining members adjacent to where that link is attached to at least two of the duct defining members.

15. The HRSG of claim 14, wherein each of the internal flanges comprises:
elongated plates interconnected to each other to define an annular structure, the flanges are each formed of a material having a coefficient of thermal expansion that is substantially similar to the coefficient of thermal expansion of the duct defining members.

* * * * *